US006987441B2

(12) United States Patent
Roeland

(10) Patent No.: US 6,987,441 B2
(45) Date of Patent: Jan. 17, 2006

(54) METHOD FOR CLOSING AND OPENING A CONTAINER

(75) Inventor: Hendrikus Johannes Roeland, Steenbergen (NL)

(73) Assignee: Rubicon Holding B.V., Leystad (NL)

( * ) Notice: Subject to any disclaimer, the term of this patent is extended or adjusted under 35 U.S.C. 154(b) by 209 days.

(21) Appl. No.: 10/257,581

(22) PCT Filed: Apr. 10, 2001

(86) PCT No.: PCT/NL01/00287

§ 371 (c)(1),
(2), (4) Date: Apr. 7, 2003

(87) PCT Pub. No.: WO01/79632

PCT Pub. Date: Oct. 25, 2001

(65) Prior Publication Data

US 2003/0156010 A1 Aug. 21, 2003

(30) Foreign Application Priority Data

Apr. 13, 2000 (NL) .................................... 1014939

(51) Int. Cl.
*G05B 19/00* (2006.01)

(52) U.S. Cl. ....................................... 340/5.73; 340/5.2

(58) Field of Classification Search ............... 340/5.73, 340/5.2, 5.21, 5.28, 5.1, 5.5, 5.33, 825.6, 340/825.49; 455/420, 404.2; 342/44; 235/375
See application file for complete search history.

(56) References Cited

U.S. PATENT DOCUMENTS

| | | | | |
|---|---|---|---|---|
| 4,750,197 | A | 6/1988 | Denekamp et al. | 379/58 |
| 5,164,718 | A | 11/1992 | Cedergren | 340/825.31 |
| 5,648,763 | A | 7/1997 | Long | 340/825.49 |
| 5,705,991 | A | 1/1998 | Kniffin et al. | 340/825.31 |
| 5,751,245 | A | 5/1998 | Janky et al. | 342/357 |
| 5,907,286 | A | 5/1999 | Kuma | 340/825.31 |
| 6,192,236 | B1 * | 2/2001 | Irvin | 455/420 |
| 6,384,709 | B2 * | 5/2002 | Mellen et al. | 340/5.2 |

* cited by examiner

*Primary Examiner*—Albert K. Wong
*Assistant Examiner*—William Bangachon
(74) *Attorney, Agent, or Firm*—Patterson & Sheridan LLP

(57) ABSTRACT

A method for successively closing and opening a container fitted with a lock, wherein the lock furthermore comprises memory means, and wherein the container is locked at a loading location by carrying out the following steps: transmitting an identification code of the container to a central verification device via the communication means; transmitting a closing code to the memory means of the lock, via the communication means, by the central verification device; and closing the lock; and wherein the container is opened at an unloading location by carrying out the following steps: transmitting an identification code of the container to said central verification device via the communication means; transmitting an opening code to the memory means of the lock, via the communication means, by the central verification device; comparing the opening code with the closing code; and opening the lock.

16 Claims, 1 Drawing Sheet

METHOD FOR CLOSING AND OPENING A CONTAINER

Figure 1:
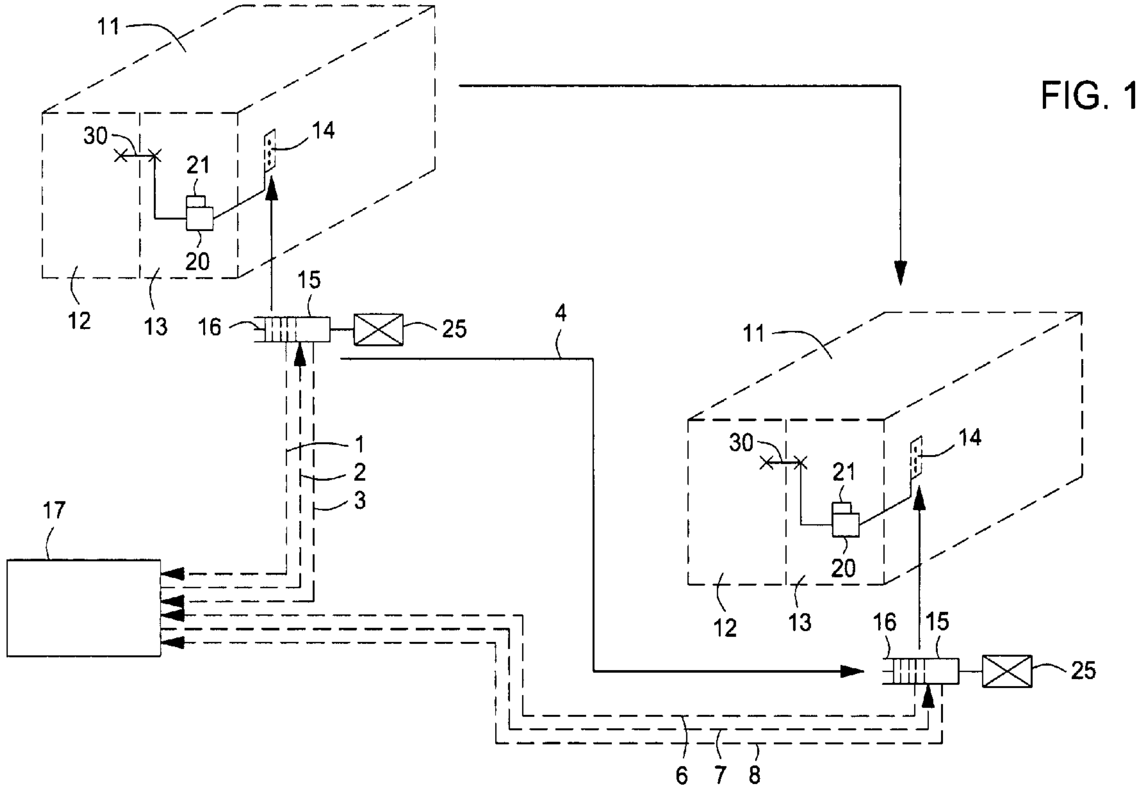

The invention relates to a method for closing and/or opening a container fitted with a lock. In this connection the term container is understood to mean a transport container, such as a standard sea container, for example, or the loading space of a lorry. Such a method is generally known. The lock that locks the loading doors of the container on the outside is thereby locked and opened with a key in order to protect the, often valuable, contents of the container. The key can travel along with the container under trust of the carrier or be sent separately from the loading location to the unloading location.

The fact that such containers are quite frequently opened by malevolent individuals intending to steal the contents of the container from the rightful owner is a great worry to carriers and insurers. Especially in the case of containers whose contents are valuable it is not unusual for the lock to be opened with false keys or stolen keys, sometimes even with the co-operation of an employee of the carrier.

The object of the invention is to provide a simple, effective, efficient and reliable method for closing and/or opening a container which reduces the risk of theft of goods.

In order to accomplish that objective, a code, for example an opening code, is transmitted to the lock via telecommunication means. This it possible to open the container from a central location by remote control. Preferably, the lock comprises memory means, wherein the container is locked at a loading location by carrying out the following steps: transmitting an identification code of the container to a central verification device via the communication means; transmitting a closing code to the memory means of the lock, via the communication means, by the central verification device; and closing the lock; and wherein the container is opened at an unloading location by carrying out the following steps: transmitting an identification code of the container to said central verification device via the communication means; transmitting an opening code to the memory means of the lock, via the communication means, by the central verification device; comparing the opening code with the closing code; and opening the lock. This method provides a reliable procedure for closing and subsequently opening the container, wherein it is made much more difficult, for example for employees of the carrier, to carry out any malevolent plans they may have.

Preferably, said communication means comprise a transceiver, more preferably a GSM and/or a satellite communication device, so that the method can be implemented independently of the telecommunication structure that is available.

The invention can be used with universal transceivers, which can be used with any type of container, but in a preferred embodiment of the method, each container has its own transceiver, and said transceiver is transported from the loading location to the unloading location separately from the container, wherein the transceiver is preferably arranged to operate only in response to a predetermined identification code of a container. In this manner the possibilities of fraud are further reduced.

The invention is in particular advantageous when the container is transported across the sea or by rail, because the amount of individual surveillance on the container is limited with this kind of transport, unlike transport by lorry, for example.

Preferably, the transceiver comprises electrical contacts, preferably on the outside of the container, which can be connected to the lock. Preferably, the lock is located inside the container, on the inner side of the loading doors, so that it is very difficult to break open with a jemmy of with other tools. Preferably, the lock is closed and opened electrically, whereby the lock is fed from a battery that is present in side the container, and possibly by an external power supply in the case that the battery is empty or fails to work.

In a special embodiment, the transceiver furthermore comprises a GPS positioning device, wherein the position of the transceiver is preferably compared with the position of the predetermined unloading location before the central verification device transmits the opening code. In this manner a stolen container is prevented from being opened at a location other than the delivery address.

Preferably, the identification code of the container is compared with a file comprising identification codes of missing containers before the central verification device transmits the opening code. In this manner the missing containers can be prevented from being opened in a simple manner.

The invention furthermore relates to a container including a lock, a transceiver and a central verification device which are clearly arranged for being used with the method according to the invention.

The invention will now be explained in more detail by means of an exemplary embodiment of the method according to the invention which is schematically illustrated in the FIGURE.

The FIGURE shows a container 11, which is intended for being transported by ship. Container 11 has a unique identification code, which is placed on the wall of the container, for example. Container 11 includes an internal lock 30 (shown schematically), which is capable of locking the loading doors 12, 13. Opening and closing of the lock 30 can only by done electrically from inside, to that end a battery 21 (shown schematically) is present in the container. The lock 30 furthermore includes memory means 20 (shown schematically), in which various codes can be stored, among which the identification code of the container 11. The memory means 20 are connected to an electric contact 14, which is present in the wall on the outside of the container.

The FIGURE furthermore shows a transceiver 15, which is preferably a satellite transceiver, so that it can be used all over the world. Transceiver 15 includes electric contacts 16, which can be plugged into the contact 14 of container 11. The unique transceiver 15 is arranged in such a manner that it can only co-operate with a specific container 11 having a specific identification code. transceiver 15 furthermore comprises a GPS (Global positioning system) device 25 (shown schematically), which is known in the art, which is capable of determining the coordinates of the position on earth and of the transmitting said coordinates to the central verification device 17.

The central verification device 17 comprises a central processor unit, central memory means and a central transceiver, which is capable of communication with transceiver 15.

After the container has been loaded with goods at the loading location, doors 12, 13 are closed. Transceiver 15 is plugged into contact 14 and the identification code is read from the memory means of the lock and transmitted to the central verification device 17 (arrow 1). In response thereto, the central verification device 17 transmits a closing code to the memory means in the lock (arrow 2) via transceiver 15. Following that, the lock is closed electrically, and confirmation thereof is transmitted to the central verification device 17 (arrow 3).

Transceiver 15 is unplugged from contact 14 and despatched to the unloading location of the container 11 by courier service (arrow 4). Container 11 is likewise transported to the unloading location, in this case by ship (arrow 5). In the FIGURE, the container 11 and the transceiver 15 at the unloading location are illustrated in dotted lines.

In order to open container 11, transceiver 15 is plugged into contact 14 again at the unloading location, after which the identification code of container 11 is transmitted to the central verification device 17 in a similar manner as upon closing of the container (arrow 6). The central verification device verifies whether container 11 is listed as missing and whether the GPS coordinates of transceiver 15 correspond to those of the stated unloading location. If the result of both verifications is positive, the central verification device 17 transmits the opening code, which may for example be identical to the previously transmitted closing code, to the lock (arrow 7). A specific arithmetic or cryptographic connection may exist between each pair of closing and opening codes, for example. In the lock, the opening code is compared with the closing code, and if the two match, the lock will be automatically opened. If the opening code and the closing code do not match, the lock will remain closed and consequently the container 11 cannot be opened. After the lock has been opened, confirmation thereof is transmitted to the central verification device 17 (arrow 8), after which the opening code and the closing code can be erased from the memory. New codes are used for a next closing and opening cycle, which codes may be determined at random by the central verification device 17, for example, in order to prevent fraud as much as possible.

What is claimed is:

1. A method for successively closing and opening a container fitted with a lock, wherein the lock comprises memory capabilities, and wherein the container is locked at a loading location by carrying out the following steps:

transmitting an identification code of the container to a central verification device via a transceiver;

transmitting a closing code to the memory of the lock, via the transceiver, by the central verification device;

closing the lock; and wherein the container is opened at an unloading location by carrying out the following steps:

transmitting an identification code of the container to said central verification device via the transceiver;

transmitting an opening code to the memory of the lock, via the transceiver, by the central verification device;

comparing the opening code with the closing code; and opening the lock.

2. The method according to claim 1, wherein the transceiver includes communication capabilities for transmitting data to and from the central verification device at remote locations.

3. The method according to claim 2, wherein said transceiver comprise a GSM and/or a satellite communication device.

4. The method according to claim 1, further including transporting the transceiver from the loading location to the unloading location separately from the container.

5. The method according to claim 4, wherein the transceiver is arranged to operate only in response to a predetermined identification code of a container.

6. The method according to claim 2, wherein the transceiver comprises electrical contacts which can be connected to the lock.

7. The method according to claim 1, wherein the container is transported across the sea and/or by rail.

8. The method according to claim 1, wherein the lock is located inside the container.

9. The method according to claim 1, wherein the lock is closed and opened electrically, whereby the lock is fed from a battery.

10. The method according to claim 2, wherein the transceiver furthermore comprises a GPS positioning device.

11. The method according to claim 10, wherein the position of the transceiver is compared with the position of the predetermined unloading location before the central verification device transmits the opening code.

12. The method according to claim 1, wherein the identification code of the container is compared with a file comprising identification codes of missing containers before the central verification device transmit the opening code.

13. A method for closing and opening a container comprising:

locking the container by;

plugging a transceiver into a contact, the contact in communication with a memory component of a lock;

transmitting a container identification code from the transceiver to a central verification device;

transmitting a closing code to the lock via the transceiver;

unlocking the container by;

plugging the transceiver into the contact, the contact in communication with the memory component of the lock;

transmitting the container identification code from the transceiver to the central verification device; and transmitting an opening code to the lock via the transceiver.

14. The method of claim 13, further including transporting the transceiver to an unloading location separately from the container.

15. The method of claim 14, further including operating the transceiver only with a predetermined identification code of a container.

16. The method of claim 13, wherein the lock is located inside the container.

* * * * *